P. S. BUCKMINSTER.
Chuck for Rock-Drilling Machines.

No. 198,486. Patented Dec. 25, 1877.

Witnesses
J. M. Pardy.
Wm. R. Bailey

Inventor.
Prescott S. Buckminster
per his atty Geo. Pardy

UNITED STATES PATENT OFFICE.

PRESCOTT S. BUCKMINSTER, OF BELLEVILLE, NEVADA.

IMPROVEMENT IN CHUCKS FOR ROCK-DRILLING MACHINES.

Specification forming part of Letters Patent No. 198,486, dated December 25, 1877; application filed September 3, 1877.

*To all whom it may concern:*

Be it known that I, PRESCOTT S. BUCKMINSTER, of Belleville, Esmeralda county, State of Nevada, have invented an Improved Drill-Chuck for Rock-Drilling Machines, of which the following is a specification:

The object of my invention is to provide a convenient and simple means of clamping the drill-bar to the piston-rod of a rock-drilling engine, so that the said drill-bar may be firmly held and easily and quickly adjusted.

Figure 1:
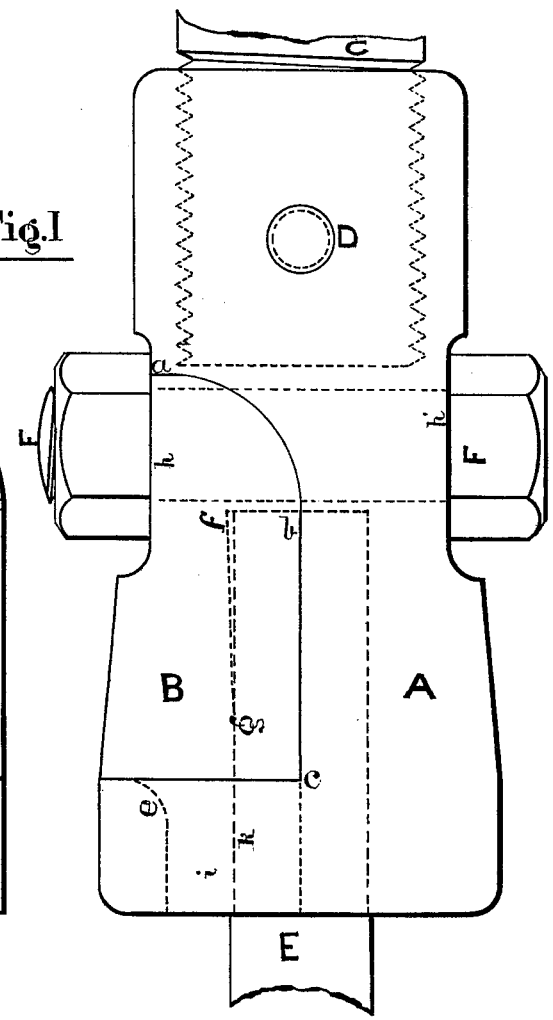
Figure 2:
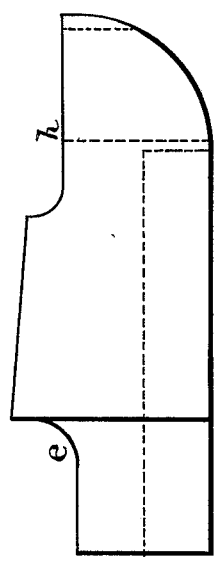
Figure 3:
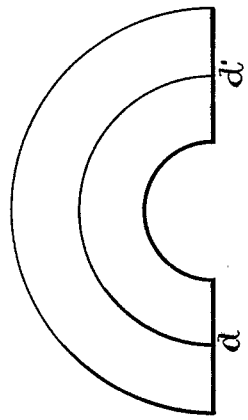
Figure 4:
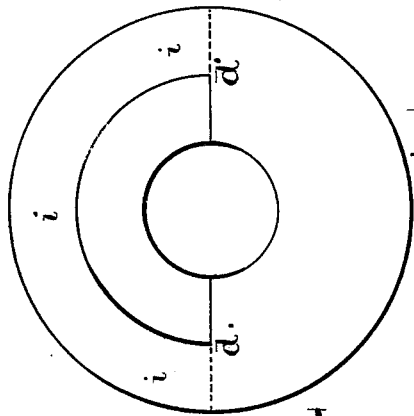

In the accompanying drawing, Figure 1 is a side elevation of my chuck complete attached to piston-rod, and with drill-bar inserted. Fig. 2 is an elevation of a detached part of the chuck, which I may call the "clamping-wedge." Fig. 3 is an end view of the same. Fig. 4 is an end view of the chuck complete, as in Fig. 1.

The chuck formed of the two pieces A and B is screwed on the end of the piston-rod C, a tapering pin, D, being driven through both, to prevent the chuck from working loose.

The shape of the pieces A and B may be understood by the following description: Take a round tapered bar of iron, about six inches long, three inches diameter at one end, and two and a half inches diameter at the other end. At the exact center of the large end drill a hole about three inches deep, large enough to accommodate the shank of the drill-bar E. The other end will have a hole drilled in about two inches, and tapped out with a screw-thread large enough to accommodate the piston-rod.

Beginning at the point $a$, about two and a quarter inches from the piston-rod end of the chuck, take a cut curving inward and toward the drill end until the cut extending across the full diameter reaches the point $b$, tangent with the center or axis of the bar. Now extend the cut still across its full diameter to the point $c$, about an inch from the end of the chuck. There the cut is carried a half inch deep around the circumference at $c$, just extending half-way around. To meet this cut at the bottom, a circular cut is taken one inch deep from $d$ to $d'$. Finally a parting is made between the two pieces A and B by a diametrical cut from $d$ to $d'$, Figs. 3 and 4. A fillet, $e$, Figs. 1 and 2, may be left, if desired, and the hole bored for the shank of the drill should be made deeper in the piece B from the point $f$ to $g$, Fig. 1.

F is a bolt, which, being screwed up, draws the two parts A and B together, a flat place being made on the chuck at $h$ $h'$ to accommodate the head and nut of this bolt.

When the drill is inserted in the chuck the bolt is screwed up, the clamp-piece B, having its fulcrum at $e$, is wedged tightly in between the drill-shank and the half-ring $i$ of the piece A, bearing on the drill-shank from $g$ to $k$, and the drill-bar is thus firmly held.

What I claim as my invention, and desire to secure by Letters Patent, is as follows:

The drill-chuck composed of the socket-piece A, having the half-ring $i$, under which the clamping-wedge B is inserted to find a fulcrum-rest, the bolt F drawing the parts together to clamp the drill-bar inserted between them, as and for the purpose described.

P. S. BUCKMINSTER.

Witnesses:
 J. W. HOGAN,
 RUFUS BATES.